(12) United States Patent
Wong

(10) Patent No.: US 7,590,780 B2
(45) Date of Patent: Sep. 15, 2009

(54) METHOD AND COMPUTER PROGRAM PRODUCT TO MIGRATE LEGACY DATA TO A RAID ARRAY WHILE CONTEMPORANEOUSLY PROVIDING USER ACCESS TO LEGACY DATA

(75) Inventor: Jeffrey Wong, Newton, MA (US)

(73) Assignee: Broadcom Corporation, Irvine, CA (US)

( * ) Notice: Subject to any disclaimer, the term of this patent is extended or adjusted under 35 U.S.C. 154(b) by 959 days.

(21) Appl. No.: 10/982,801

(22) Filed: Nov. 8, 2004

(65) Prior Publication Data

US 2006/0112298 A1 May 25, 2006

(51) Int. Cl.
*G06F 13/14* (2006.01)
(52) U.S. Cl. .............................. 710/74; 710/8; 711/161
(58) Field of Classification Search ........................ None
See application file for complete search history.

(56) References Cited

U.S. PATENT DOCUMENTS 6,976,103 B1 * 12/2005 Watanabe et al. ............. 710/74

2007/0168630 A1 * 7/2007 Hirakawa et al. ........... 711/162

OTHER PUBLICATIONS

Patterson et al., "A Case for Redundant Arrays of Inexpensive Disks (RAID)," Computer Science Division, Dept. of Electrical Engineering and Computer Science, University of California, ACM 0-89791-268-3, (1988), pp. 109-116 (8 pages).
"Raid," SearchStorage.com Definitions, May 2004, 3 pages.
"RC4000 Series Controller User's Guide RAIDCore," Copyright 2003, Broadcom Corporation, 109 pages.

* cited by examiner

*Primary Examiner*—Ilwoo Park
(74) *Attorney, Agent, or Firm*—Sterne, Kessler, Goldstein & Fox PLLC

(57) ABSTRACT

A method and related computer program product for migrating legacy data to a RAID array while contemporaneously providing user access to legacy data, comprising connecting the legacy drive to the RAID controller, converting the legacy drive into a legacy array, selecting the legacy array and selecting the RAID array to migrate the legacy data to.

12 Claims, 8 Drawing Sheets

METHOD AND COMPUTER PROGRAM PRODUCT TO MIGRATE LEGACY DATA TO A RAID ARRAY WHILE CONTEMPORANEOUSLY PROVIDING USER ACCESS TO LEGACY DATA

FIELD OF THE INVENTION

This invention generally relates to RAID controllers and more specifically to migrating legacy data from a legacy drive to a RAID array, without backup and restore, while contemporaneously providing user access to the legacy data.

BACKGROUND OF THE INVENTION

There are many applications, particularly in a business environment, where there are needs beyond what can be fulfilled by a single hard disk, regardless of its size, performance or quality level. Many businesses can't afford to have their systems go down for even an hour in the event of a disk failure. They need large storage subsystems with capacities in the terabytes. And they want to be able to insulate themselves from hardware failures to any extent possible. Some people working with multimedia files need fast data transfer exceeding what current drives can deliver, without spending a fortune on specialty drives. These situations require that the traditional "one hard disk per system" model be set aside and a new system employed. This technique is called Redundant Arrays of Inexpensive Disks or RAID. ("Inexpensive" is sometimes replaced with "Independent", but the former term is the one that was used when the term "RAID" was first coined by the researchers at the University of California at Berkeley, who first investigated the use of multiple-drive arrays in 1987. See D. Patterson, G. Gibson, and R. Katz. "A Case for Redundant Array of Inexpensive Disks (RAID)", Proceedings of ACM SIGMOD '88, pages 109-116, June 1988.

The fundamental structure of RAID is the array. An array is a collection of drives that is configured, formatted and managed in a particular way. The number of drives in the array, and the way that data is split between them, is what determines the RAID level, the capacity of the array, and its overall performance and data protection characteristics.

An array appears to the operating system to be a single logical hard disk. RAID employs the technique of "striping", which involves partitioning each drive's storage space into units ranging from a sector (512 bytes) up to several megabytes. The stripes of all the disks are interleaved and addressed in order.

In a single-user system where large records, such as medical or other scientific images, are stored, the stripes are typically set up to be relatively small (perhaps 64 k bytes) so that a single record often spans all disks and can be accessed quickly by reading all disks at the same time.

In a multi-user system, better performance requires establishing a stripe wide enough to hold the typical or maximum size record. This allows overlapped disk I/O (Input/Output) across drives.

Most modern, mid-range to high-end disk storage systems are arranged as RAID configurations.

One description of RAID types can be found at http://searchstorage.techtarget.com/sDefinition/0,,sid5_gci214332,00.h tml.

A number of RAID levels are known. JBOD stands for Just a Bunch of Drives. The controller treats one or more disks or unused space on a disk as a single array. JBOD provides the ability to concatenate storage from various drives regardless of the size of the space on those drives. JBOD is useful in scavenging space on drives unused by other arrays. JBOD does not provide any performance or data redundancy benefits.

RAID0, or striping, provides the highest performance but no data redundancy. Data in the array is striped (i.e. distributed) across several physical drives. RAID0 arrays are useful for holding information such as the operating system paging file where performance is extremely important but redundancy is not.

RAID1, or mirroring, mirrors the data stored in one physical drive to another. RAID1 is useful when there are only a small number of drives available and data integrity is more important than storage capacity.

RAID1n, or n-way mirroring, mirrors the data stored in one hard drive to several hard drives. This array type will provide superior data redundancy because there will be three or more copies of the data and this type is useful when creating backup copies of an array. This array type is however expensive, in both performance and the amount of disk space necessary to create the array type.

RAID10 is also known as RAID(0+1) or striped mirror sets. This array type combines mirrors and stripe sets. RAID10 allows multiple drive failures, up to 1 failure in each mirror that has been striped. This array type offers better performance than a simple mirror because of the extra drives. RAID10 requires twice the disk space of RAID0 in order to offer redundancy.

RAID10n stripes multiple n-way mirror sets. RAID10n allows multiple drive failures per mirror set, up to n−1 failures in each mirror set that has been striped, where n is the number of drives in each mirror set. This array type is useful in creating exact copies of an array's data using the split command. This array type offers better random read performance than a RAID10 array, but uses more disk space.

RAID5, also known as a stripe with parity, stripes data as well as parity across all drives in the array. Parity information is interspersed across the drive array. In the event of a failure, the controller can rebuild the lost data of the failed drive from the other surviving drives. This array type offers exceptional read performance as well as redundancy. In general, write performance is not an issue due to the tendency of operating systems to perform many more reads than writes. This array type requires only one extra disk to offer redundancy. For most systems with four or more disks, this is the correct choice as array type.

RAID50 is also known as striped RAID5 sets. Parity information is interspersed across each RAID5 set in the array. This array type offers good read performance as well as redundancy. A 6-drive array will provide the user with 2 striped 3-drive RAID5 sets. Generally, RAID50 is useful in very large arrays, arrays with 10 or more drives.

Thus RAID or Redundant Array of Independent Disks are simply several disks that are grouped together in various organizations to either improve the performance or the reliability of a computer's storage system. These disks are grouped and organized by a RAID controller.

Each conventional RAID controller has a unique way to layout the disks and store the configuration information. On the other hand, a system controlled by a common operating system has a known format. When users try to add a RAID controller to their system, the most important task is to migrate the existing data disks to a RAID controlled system. The common operating system configuration format to control and communicate with a disk in the system is referred to as "metadata". The OS metadata is different from the RAID controller's unique configuration format which is also referred to as "metadata". Because the OS metadata is different from the RAID controller metadata there is a conflict in recognizing the different formats. Hence, backing up existing data and then restoring it is the common method to migrate existing user data. This however requires system downtime where the user has no access to the data (which can sometimes be up to a day depending on the volume of data being migrated).

What is required is a method to obviate the need to backup and restore existing data and eliminate any system downtime needed for migrating existing user data to a RAID system.

SUMMARY OF THE INVENTION

The invention comprises a method and related computer program product for migrating legacy data to a RAID array while contemporaneously providing user access to legacy data, comprising connecting the legacy drive to the RAID controller, converting the legacy drive into a legacy array, selecting the legacy array and selecting the RAID array to migrate the legacy data to.

Additional features and advantages of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. The detailed description is not intended to limit the scope of the claimed invention in any way.

DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

A disk drive connected to an IDE or SATA controller and controlled by an operating system (OS) has a known format. To enable control and communication with the disk, the system OS configures a disk drive by writing its metadata into the disk drive. RAID controllers also write their unique metadata into a disk to enable communication and control with the disk. Different RAID controllers have unique ways to layout the disks, setup the user and store the configuration information or metadata on the disk.

Figure 1:
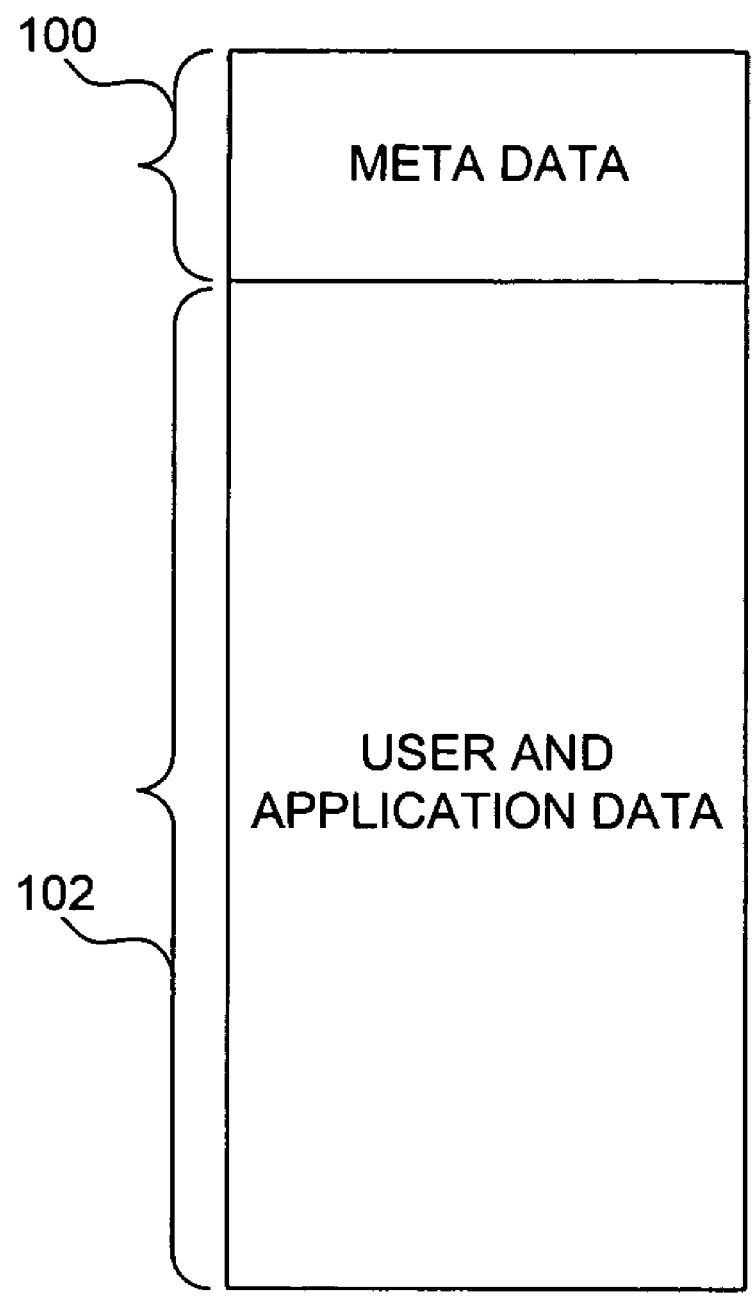
FIG. 1 illustrates a disk and the allocation of its space for metadata and user data.

FIG. 1 shows a disk drive that has metadata 100 written into part of the disk and the rest of the space is allocated to user data and applications 102. In a computer system, if a disk drive is connected to a SATA or IDE controller and is controlled by the OS, then this drive is referred to as a "legacy drive" and the user data it contains is referred to as "legacy data". If a disk drive or multiple disk drives are connected to and controlled by a RAID controller, then they are known as a "RAID array". If the metadata 100 is written by the RAID controller, then the common RAID controllers will be able to control and communicate with the drive. If a legacy drive which has metadata 100 written by OS is connected to a RAID controller, then some RAID controllers will not be able to recognize the drive as a legacy drive and will treat the drive as a new drive that has no data on it. However, some RAID controllers which are able to recognize common OS formats such as Windows, or LINUX will be able to recognize the drive as a legacy drive when the drive is connected to the RAID controller. The RAID controller in the present invention has the ability to recognize such common OS formats and can provide support enabling user access to legacy data when the legacy drive has been disconnected from the SATA or IDE controller and connected to the RAID controller. A legacy drive connected to a RAID controller, that can be supported by a RAID controller, without any loss of the legacy data, is known as a "legacy array". The user data on the legacy array is still referred to as "legacy data".

Since common OS metadata is different from the RAID controller metadata, the conventional method of migrating legacy data to a RAID array involves backing up legacy data to another storage medium and then restoring it to a RAID array. This process usually involves the use of special software means along with backup hardware such as another disk drive or a magnetic tape drive.

Figure 2:
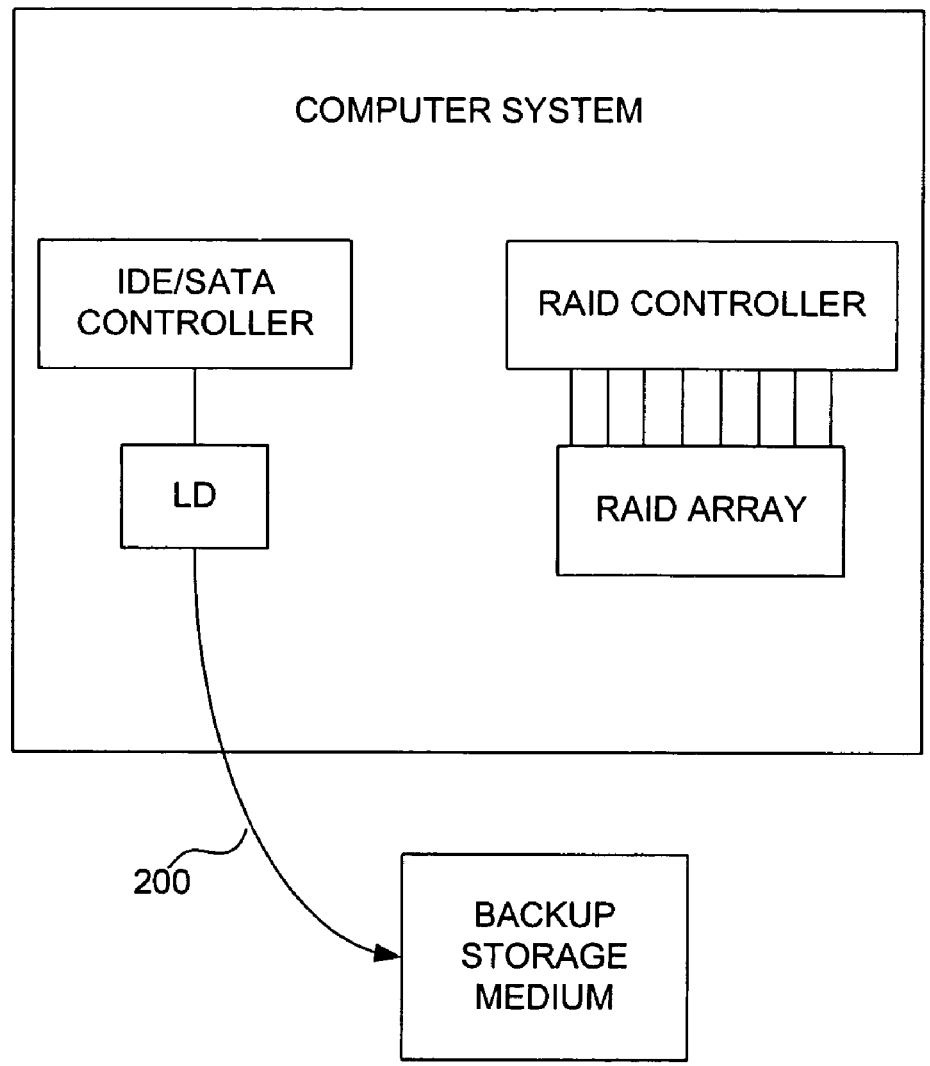
FIG. 2 illustrates the process of backing up legacy data.

FIG. 2 shows the process of backing up legacy data. Here, the legacy drive LD is connected to a SATA or IDE controller and to a backup storage medium through link 200. The data from the legacy drive LD is backed up to the backup storage medium.

Figure 3:
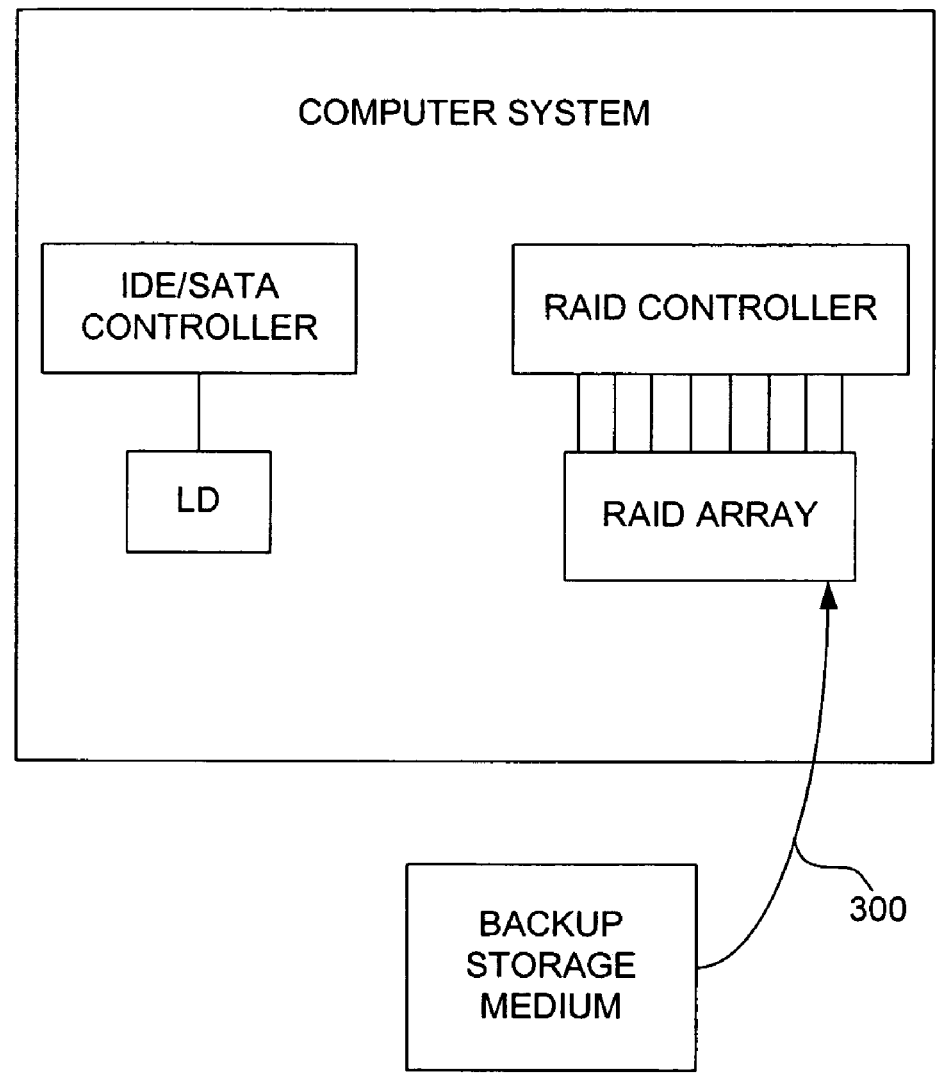
FIG. 3 illustrates the process of restoring legacy data.

FIG. 3 shows the process of restoring legacy data. Here, the backup storage medium is connected to the RAID array through link 300. The legacy data stored in the storage medium is restored to the RAID array. The process of backing up legacy data to a storage medium and then restoring it to a RAID array is time consuming and involves the extra cost of backup hardware and software. In some cases the backup and restore process can take a whole day depending upon the amount of legacy data and the data transfer rates of the legacy drive, the backup storage medium and the RAID array. The greatest drawback however, is that users cannot access the legacy data until the backup and restore process has been completed.

The present invention deals with migrating user data from the legacy drive to the RAID array while contemporaneously providing access to user data. Before the migration of legacy data can take place, the legacy drive has to be converted into a legacy array so that users can access legacy data through the RAID controller.

Figure 4:
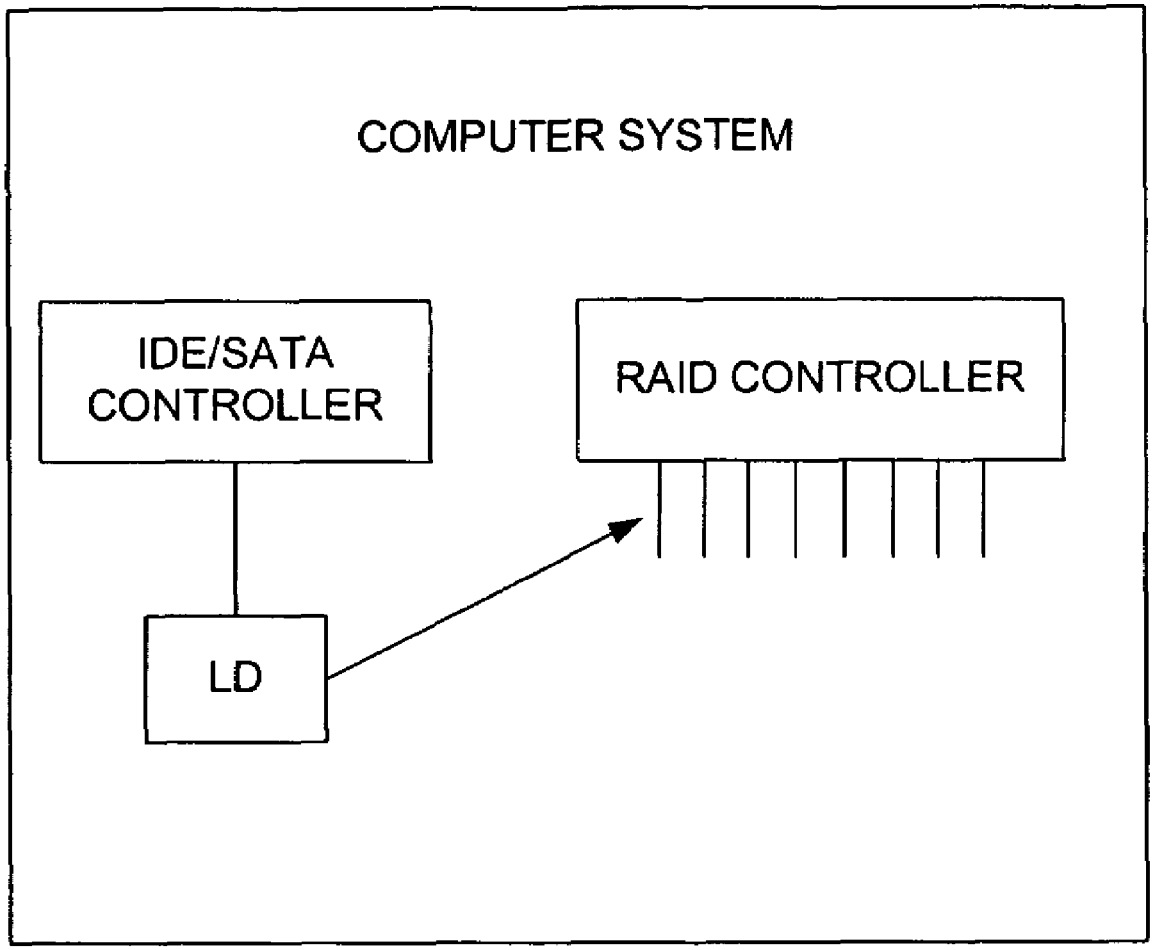
FIGS. 4-5 illustrates the process of converting a legacy drive into a legacy array.

FIG. 4 illustrates the first major step in the process of converting a legacy drive into a legacy array. Initially, the legacy drive LD is connected to a SATA or IDE controller. The RAID controller is first installed in the system without any drives attached to it. Next, the system is booted and the drivers for the RAID controller are installed.

Figure 5:
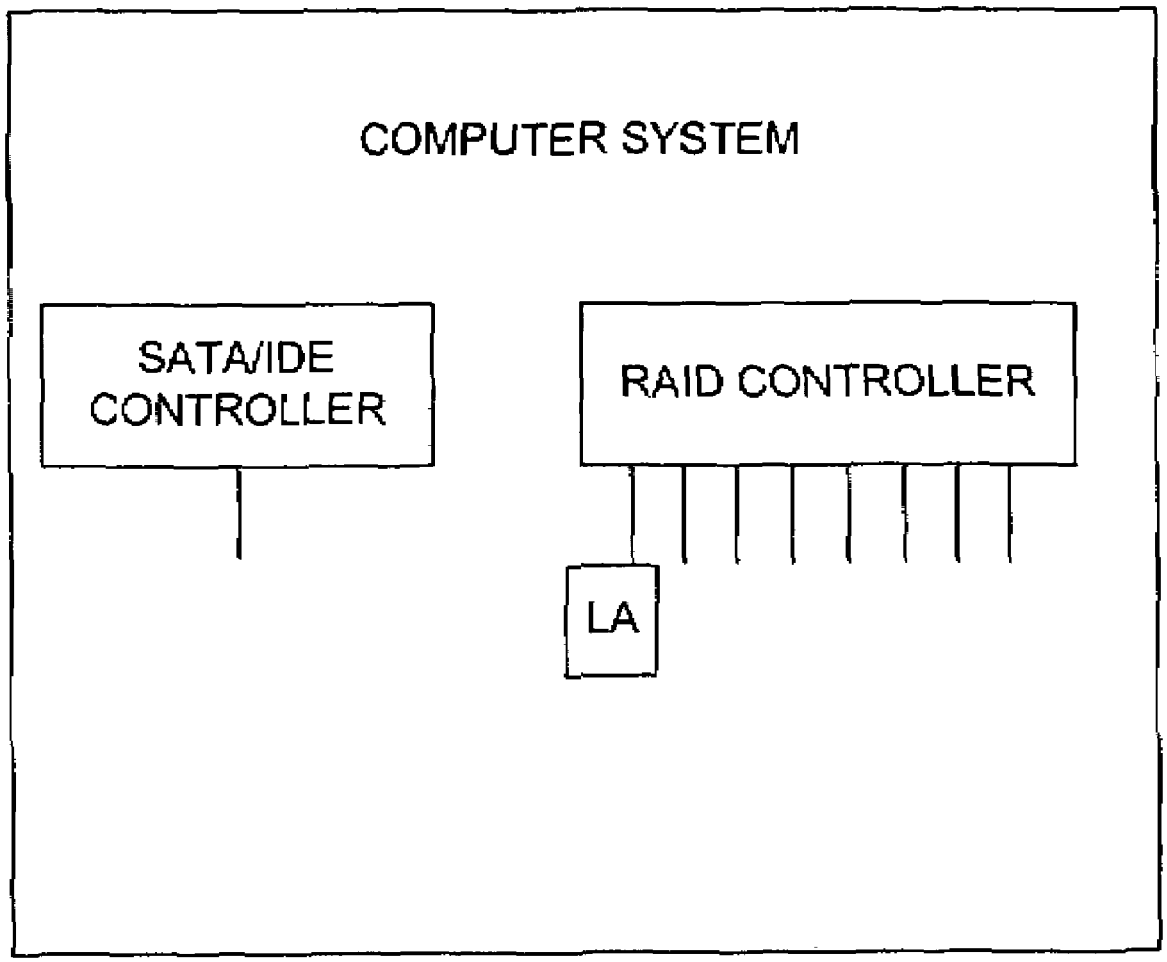

FIG. 5 illustrates the second major step in converting a legacy drive into a legacy array. The legacy drive is disconnected from the SATA or IDE controller and connected to the RAID controller. The system is re-booted and the legacy drive is now a legacy array LA. The RAID controller can now provide user access to legacy data from the legacy array. The process described above in FIGS. 4 and 5 takes a few minutes during which the system is down and the legacy data is inaccessible. After the legacy drive has been converted to the legacy array, no more system downtime will be required during migration of legacy data to a RAID array.

Figure 6:
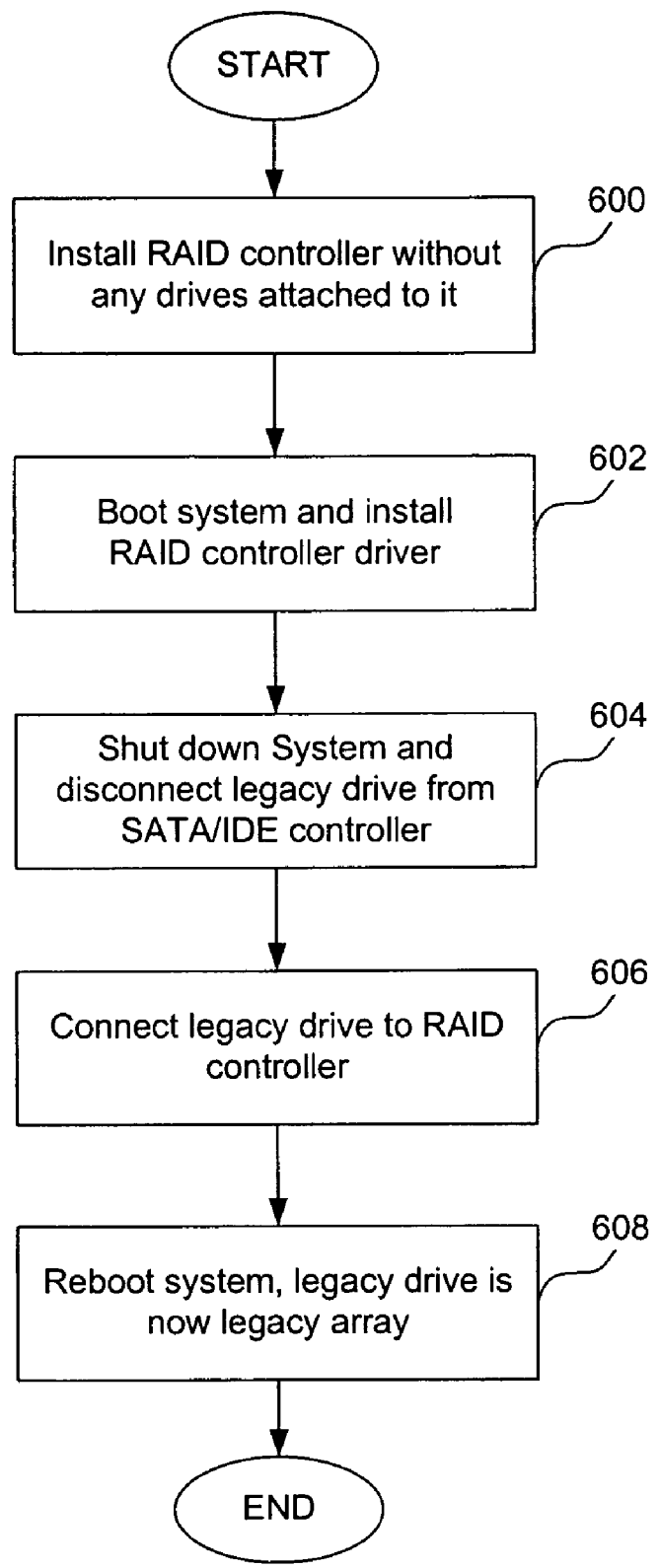
FIG. 6 illustrates an exemplary flowchart for converting a legacy drive into a legacy array.

FIG. 6 illustrates an exemplary flowchart for converting a legacy drive into a legacy array. In step 600, the system is shutdown and the RAID controller is installed in the system without any disk drive attached to it.

Next, in step 602, the system is booted up and the driver for the RAID controller is installed.

Thereafter, in step 604, the system is shutdown again and the legacy drive is disconnected from the SATA or IDE controller.

Following this, in step 606, the legacy drive is connected to the RAID controller. Here, the legacy drive is the only drive connected to the RAID controller.

Next, in step 608, the system is re-booted and the legacy drive is now recognized by the RAID controller as a legacy array. The RAID controller can now provide full legacy data access to the user. After completing the steps in FIG. 6, new disks are added to the RAID controller, they are initialized and one or more RAID arrays are created. The user can choose the RAID level of protection for the new array, for example protection of RAID levels 1, 5, 10, 50 etc.

Figure 7:
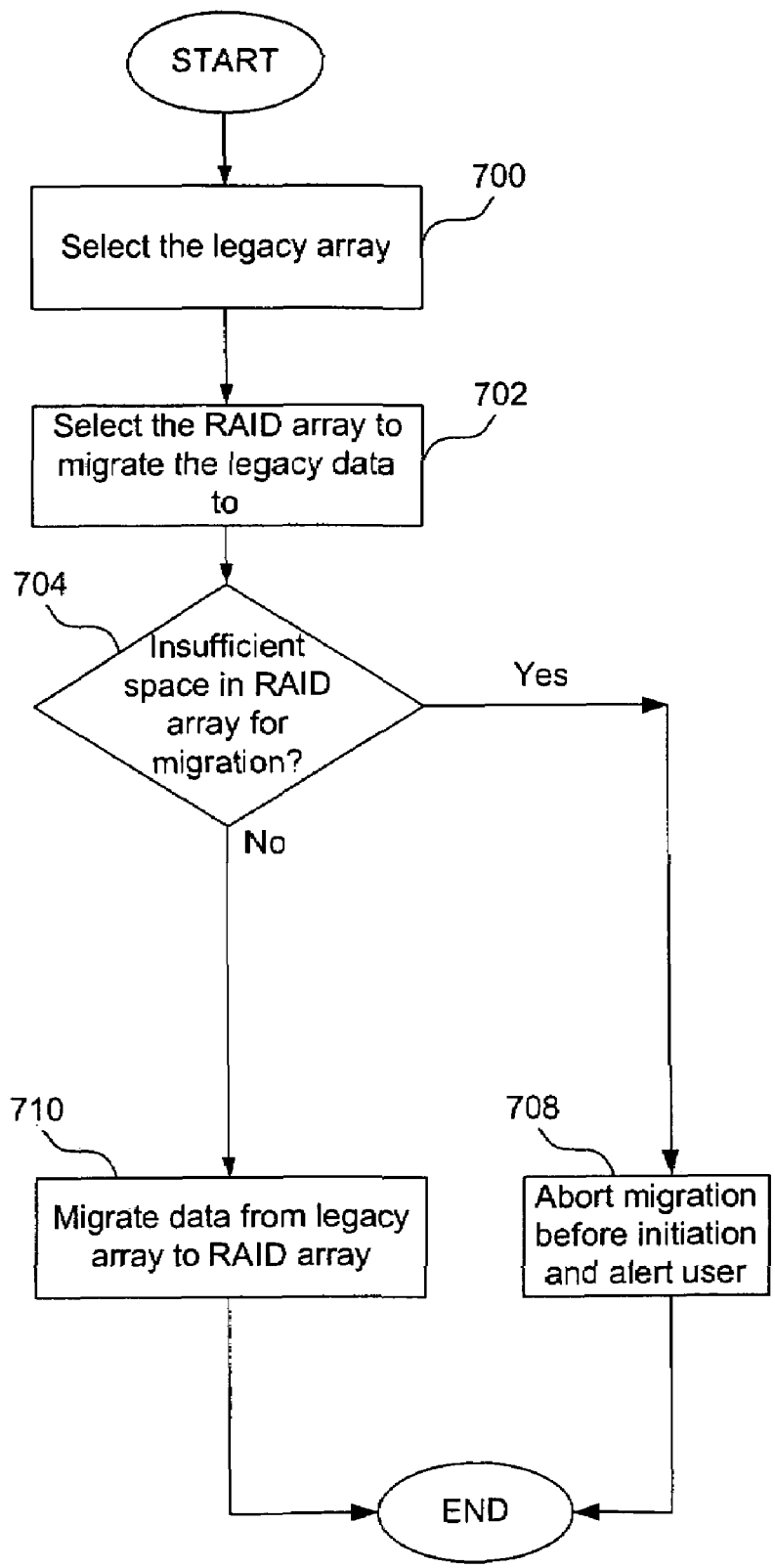
FIG. 7 illustrates an exemplary flowchart for migrating legacy data from a legacy array to a RAID array.

FIG. 7 illustrates an exemplary flowchart for migrating legacy data from a legacy array to a RAID array. The control logic is typically implemented in the RAID controller's installed drivers and software. The user typically interacts with the graphical user interface (GUI). It should be noted that the means to accomplish the steps in FIG. 7 can be implemented in hardware or software by a person skilled in the relevant art(s). These steps can be modified by a person skilled in the relevant art(s) without departing from the spirit of the invention.

First, in step 700, the user selects the legacy array whose data will be migrated to a RAID array.

Next, in step 702, the user selects the RAID array to migrate the legacy data to.

Thereafter, in step 704, it is determined whether there is sufficient space in the selected array to incorporate the legacy data.

If there is not sufficient space in the RAID array to incorporate the legacy data, then, in step 708, migration of legacy data is aborted before initiation and the user is alerted that there is insufficient space.

If there is sufficient space available, then, in step 710, the migration of legacy data from the legacy array to the RAID array is initiated. While the migration of legacy data to the RAID array is taking place, the legacy data is available to the user.

During the migration process, the graphical user interface (GUI) associated with the RAID software can display the progress of the migration. It can also display the status of the legacy array and the RAID array.

Another aspect of the invention provides RAID protection to the migrated legacy data. After the migration is completed, the legacy data will have the protection level equal to that of the RAID array it was migrated to. Thus, if the RAID array had protection of RAID level 5, then the migrated legacy data will have a RAID5 level of protection.

It is noted that the terms disk, disk drive and drive are used interchangeably throughout and all refer to a hard disk drive. The exemplary embodiment presented has only one legacy drive; however it will be apparent to persons skilled in the relevant art(s) that the method can be extended to multiple legacy drives.

Figure 8:
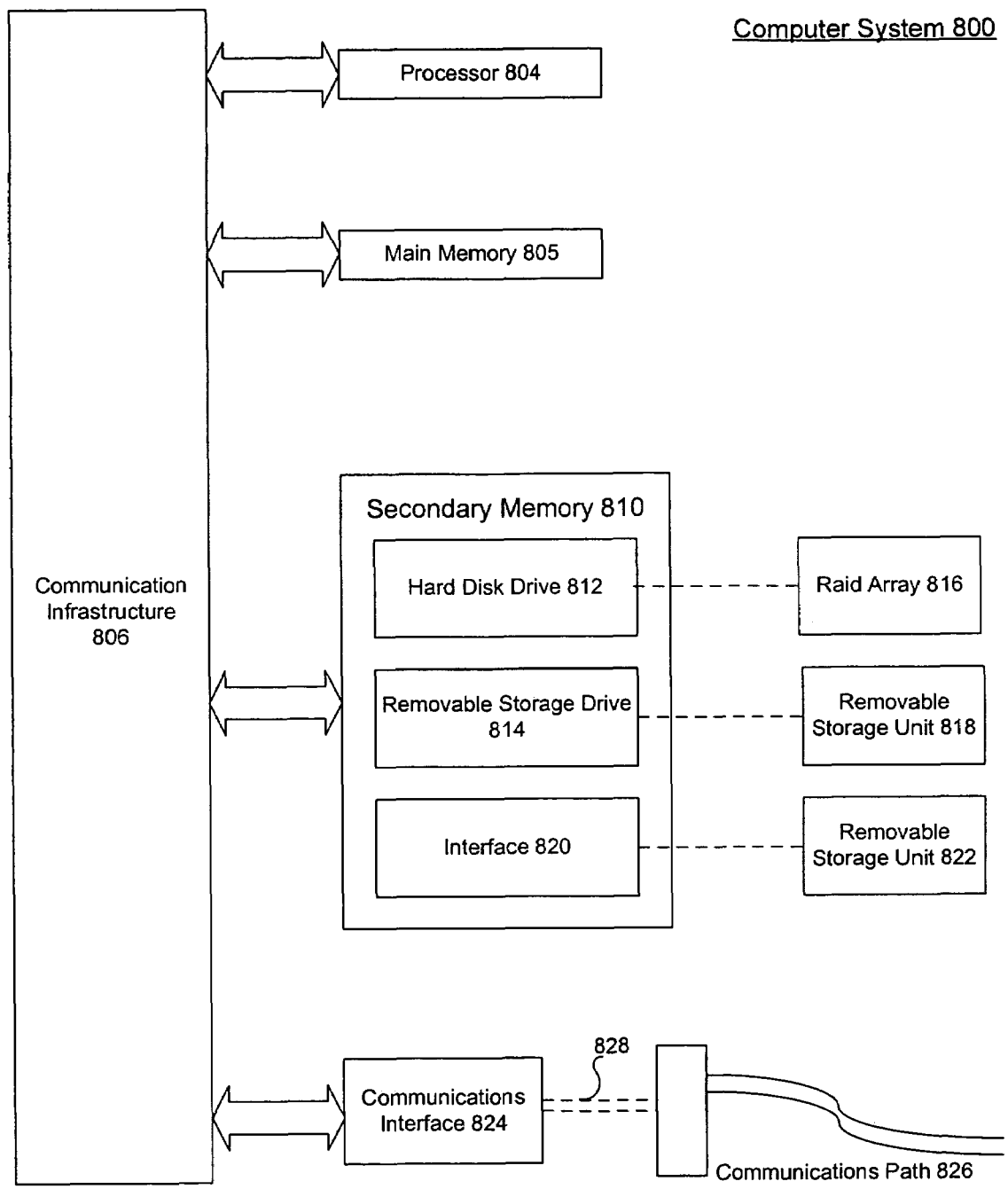
FIG. 8 is a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 800 is shown in FIG. 8. The computer system 800 includes one or more processors, such as processor 804. Processor 804 can be a special purpose or a general purpose digital signal processor. The processor 804 is connected to a communication infrastructure 806 (for example, a bus or network). Various software implementations are described in terms of this exemplary computer system. After reading this description, it will become apparent to a person skilled in the relevant art how to implement the invention using other computer systems and/or computer architectures.

Computer system 800 also includes a main memory 805, preferably random access memory (RAM), and may also include a secondary memory 810. The secondary memory 810 may include, for example, a hard disk drive 812, and/or a RAID array 816, and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. As will be appreciated, the removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCMCIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path 826. Communications path 826 carries signals 828 and may be implemented using wire or cable, fiber optics, a phone line, a cellular phone link, an RF link and other communications channels.

The terms "computer program medium" and "computer usable medium" are used herein to generally refer to media such as removable storage drive 814, a hard disk installed in hard disk drive 812, and signals 828. These computer program products are means for providing software to computer system 800.

Computer programs (also called computer control logic) are stored in main memory 808 and/or secondary memory 810. Computer programs may also be received via communications interface 824. Such computer programs, when executed, enable the computer system 800 to implement the present invention as discussed herein. In particular, the computer programs, when executed, enable the processor 804 to implement the processes of the present invention. Where the invention is implemented using software, the software may be stored in a computer program product and loaded into computer system 800 using raid array 816, removable storage drive 814, hard drive 812 or communications interface 824.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method of migrating legacy data from a legacy array to a RAID array while contemporaneously providing user access to said legacy data in a computer system, comprising:
   installing a RAID controller in said computer system without any drives attached to said RAID controller;
   booting said system;
   installing the driver for said RAID controller;
   shutting down said system;
   connecting a legacy drive to said RAID controller;
   re-booting said computer system and converting said legacy drive to said legacy array;
   migrating said legacy data from said legacy array to said RAID array; and
   providing user accessibility to said legacy data during said migration of said legacy data to said RAID array.

2. The method of claim 1, further comprising: providing data protection to said legacy data equivalent to legacy array level data protection during said migration.

3. The method of claim 1, further comprising: preventing said migration of said legacy data before initiation if there is insufficient space in said RAID array for performing said migration.

4. The method of claim 1, further comprising: displaying the progress of said migration.

5. The method of claim 4, further comprising: updating said display with said legacy array and said RAID array status.

6. The method of claim 1, further comprising: continuing said migration of said legacy data to said RAID array upon reboot in the event of system failure during said migration.

7. The method of claim 1, further comprising: providing RAID protection to said legacy data after migration to said RAID array, equivalent to the RAID level protection of said RAID array said legacy data was migrated to.

8. A tangible computer program product comprising a computer useable medium including control logic stored therein for use in migrating legacy data from a legacy array to a RAID array while contemporaneously providing user access to said legacy data in a computer system, comprising:
   first control logic means for enabling the computer to install the driver for a RAID controller;
   second control logic means for enabling the computer to convert a legacy drive attached to said RAID controller to a legacy array;
   third control logic means for enabling the computer to determine the existence of a legacy array coupled to a RAID controller;
   fourth control logic means for enabling the computer to select said legacy array;
   fifth control logic means for enabling the computer to select said RAID array to migrate said legacy data to;
   sixth control logic means for enabling the computer to migrate said legacy data from said legacy array to said RAID array; and
   seventh control logic means for enabling the computer to provide accessibility to said legacy data during said migration of said legacy data to said RAID array.

9. The tangible computer program product of claim 8, further comprising: eighth control logic means for enabling the computer to prevent said migration of said legacy data before initiation if there is insufficient space in said RAID array for performing said migration.

10. The tangible computer program product of claim 8, further comprising: eighth control logic means for enabling the computer to display the progress of said migration.

11. The tangible computer program product of claim 10, further comprising: ninth control logic means for enabling the computer to update said display with said legacy array and said RAID array status.

12. The tangible computer program product of claim 8, further comprising: eighth control logic means for enabling the computer to provide RAID protection to said legacy data after migration of said legacy data to said RAID array, equivalent to the RAID level protection of said RAID array said legacy data was migrated to.

* * * * *

UNITED STATES PATENT AND TRADEMARK OFFICE
CERTIFICATE OF CORRECTION

| | |
|---|---|
| PATENT NO. | : 7,590,780 B2 |
| APPLICATION NO. | : 10/982801 |
| DATED | : September 15, 2009 |
| INVENTOR(S) | : Jeffrey Wong |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1342 days.

Signed and Sealed this

Twenty-first Day of September, 2010

David J. Kappos
*Director of the United States Patent and Trademark Office*